US012049317B2

(12) United States Patent
Teetzel et al.

(10) Patent No.: US 12,049,317 B2
(45) Date of Patent: Jul. 30, 2024

(54) UNMANNED AERIAL SYSTEM FOR CROWD CONTROL

(71) Applicant: Wilcox Industries Corp., Newington, NH (US)

(72) Inventors: James W. Teetzel, Portsmouth, NH (US); Douglas M. Delorge, Biddeford, ME (US)

(73) Assignee: Wilcox Industries Corp., Newington, NH (US)

( * ) Notice: Subject to any disclaimer, the term of this patent is extended or adjusted under 35 U.S.C. 154(b) by 853 days.

(21) Appl. No.: 16/238,723

(22) Filed: Jan. 3, 2019

(65) Prior Publication Data

US 2019/0202558 A1    Jul. 4, 2019

Related U.S. Application Data

(60) Provisional application No. 62/613,225, filed on Jan. 3, 2018.

(51) Int. Cl.
| | |
|---|---|
| *B64D 1/16* | (2006.01) |
| *B64C 27/20* | (2023.01) |
| *B64C 39/02* | (2023.01) |
| *B64D 45/00* | (2006.01) |
| *B64D 47/06* | (2006.01) |
| *B64D 47/08* | (2006.01) |
| *G01S 19/42* | (2010.01) |
| *B64U 101/00* | (2023.01) |

(52) U.S. Cl.
CPC ............... *B64D 1/16* (2013.01); *B64C 27/20* (2013.01); *B64C 39/024* (2013.01); *B64D 45/00* (2013.01); *B64D 47/06* (2013.01); *B64D 47/08* (2013.01); *G01S 19/42* (2013.01); *B64U 2101/00* (2023.01)

(58) Field of Classification Search
CPC . B64C 39/024; B64C 27/20; B64C 2201/126; B64D 1/16; B64D 45/00; B64D 47/06; B64D 47/08; G01S 19/42; B64U 2101/00
See application file for complete search history.

(56) References Cited

U.S. PATENT DOCUMENTS

| | | | |
|---|---|---|---|
| 9,376,208 B1* | 6/2016 | Gentry | G08G 5/006 |
| 9,563,945 B2* | 2/2017 | Fryshman | H04N 5/225 |
| 10,155,587 B1* | 12/2018 | Tang | B64C 27/08 |
| 10,569,877 B2* | 2/2020 | Miller | B05B 7/1422 |
| 10,922,982 B2* | 2/2021 | Magdaleno | G05D 1/104 |

(Continued)

FOREIGN PATENT DOCUMENTS

| | | | | |
|---|---|---|---|---|
| CN | 107161346 A | * | 9/2017 | |
| WO | WO-2013123944 A1 | * | 8/2013 | B64C 27/20 |

*Primary Examiner* — Benjamin P Lee
(74) *Attorney, Agent, or Firm* — McLane Middleton, Professional Association

(57) ABSTRACT

In one aspect, an unmanned aerial system for crowd control, includes a chassis for attaching components of the unmanned aerial system and one or more rotary wings, each of the one or more rotary wings drivable by a respective motor. A container stores a pressurized source of a crowd control agent and a nozzle is provided for dispersing the crowd control agent into the air. An electronically controlled valve selectively places the nozzle into fluid communication with the container. In a further aspect, a modular unmanned aerial system for crowd control is provided.

22 Claims, 5 Drawing Sheets

(56) References Cited

U.S. PATENT DOCUMENTS

| | | | |
|---|---|---|---|
| 11,027,294 B2* | 6/2021 | Roy | B05B 12/087 |
| 11,086,312 B2* | 8/2021 | Charlton | G05D 1/0011 |
| 2003/0213869 A1 | 11/2003 | Scott et al. | |
| 2009/0283629 A1* | 11/2009 | Kroetsch | A63H 27/12 |
| | | | 244/17.23 |
| 2014/0032034 A1* | 1/2014 | Raptopoulos | H04B 7/18506 |
| | | | 701/25 |
| 2014/0303814 A1 | 10/2014 | Burema et al. | |
| 2015/0246727 A1* | 9/2015 | Masticola | B64C 39/024 |
| | | | 701/2 |
| 2016/0205872 A1 | 7/2016 | Chan et al. | |
| 2016/0214715 A1 | 7/2016 | Meffert | |
| 2018/0022310 A1 | 1/2018 | Olson | |
| 2018/0201371 A1* | 7/2018 | Kramer | B64D 1/16 |
| 2018/0312276 A1* | 11/2018 | Miller | B64C 39/022 |
| 2018/0362157 A1 | 12/2018 | Teetzel | |
| 2020/0051438 A1* | 2/2020 | Magdaleno | G05D 1/0027 |
| 2020/0302243 A1* | 9/2020 | Fryshman | A01M 1/06 |
| 2020/0354059 A1* | 11/2020 | Newman | B64D 1/18 |
| 2021/0063120 A1* | 3/2021 | Taveniku | G06K 9/00335 |
| 2021/0209352 A1* | 7/2021 | Fryshman | A01M 1/026 |
| 2021/0283639 A1* | 9/2021 | Zvara | A01M 7/0014 |
| 2021/0300549 A1* | 9/2021 | Beloussov | B64C 39/024 |
| 2021/0321601 A1* | 10/2021 | Ledebuhr | A01M 7/0089 |

* cited by examiner

UNMANNED AERIAL SYSTEM FOR CROWD CONTROL

CROSS-REFERENCE TO RELATED APPLICATION

This application claims the priority benefit of U.S. provisional application no. 62/613,225 filed Jan. 3, 2018. The aforementioned application is incorporated herein by reference in its entirety.

INCORPORATION BY REFERENCE

This application is related to U.S. provisional patent application No. 62/520,370 filed Jun. 15, 2017, and U.S. nonprovisional application Ser. No. 16/009,373 filed Jun. 15, 2018, now U.S. Pat. No. 11,396,375. Each of the foregoing applications is incorporated herein by reference in its entirety.

BACKGROUND

The present development relates to an unmanned aerial system, e.g., a small unmanned aerial system (SUAS), for crowd control, riot control, or the dispersion of demonstrators, protestors, or the like.

Crowd and riot control poses a problem for law enforcement officials. Crowds and rioters are typically dispersed by law enforcement officials using non-lethal or less-lethal weapons such as canister projectiles containing a chemical agent such as tear gas, pepper spray, MACE™ or other lachrymator agent, often fired using a riot gun or less-lethal launcher. However, there is a risk of serious injury or death to persons who may be struck by the canister projectiles. In some cases, there is a risk that the chemical agent can be blown towards the law enforcement officials. Furthermore, even when law enforcement officials are equipped with protective clothing and riot gear, there is still a risk of physical injury to the officials from unruly participants.

The present system is advantageous in that it allows the law enforcement officials to dispatch lachrymator agents without the need to fire canisters into or toward a crowd and allows law enforcement officials to remain at a safe distance from the crowd.

SUMMARY

In one aspect, an unmanned aerial system for crowd control, comprises a chassis for attaching components of the unmanned aerial system and one or more rotary wings, each of the one or more rotary wings drivable by a respective motor. A container stores a pressurized source of a crowd control agent and a nozzle is provided for dispersing the crowd control agent into the air. An electronically controlled valve selectively places the nozzle into fluid communication with the container.

In certain embodiments, the unmanned aerial system further comprises a power supply disposed on the chassis. In certain embodiments, the power source comprises a rechargeable battery.

In certain embodiments, the unmanned aerial system further comprises a radio frequency transceiver for receiving control signals from a remote control unit.

In certain embodiments, the unmanned aerial system further comprises an onboard processor and associated memory storing program instructions for controlling operation of the unmanned aerial system.

In certain embodiments, the unmanned aerial system further comprises one or more lights disposed on the chassis. In certain embodiments, the one or more lights are a color indicative of an emergency vehicle.

In certain embodiments, the unmanned aerial system further comprises a camera for acquiring one or both of photographic images and video images.

In certain embodiments, the unmanned aerial system further comprises one or both of a microphone and an audio speaker.

In certain embodiments, the unmanned aerial system further comprises a remote control unit for controlling operation of the unmanned aerial system.

In certain embodiments, the unmanned aerial system further comprises a navigation unit for obtaining position data. In certain embodiments, the navigation unit is a receiver for receiving signals from a satellite-based positioning system.

In another aspect, a modular unmanned aerial system for crowd control, comprises a chassis for attaching components of the unmanned aerial system and one or more rotary wings, each of the one or more rotary wings drivable by a respective motor. A crowd control module is removably attached to the chassis and comprises a container storing a pressurized source of a crowd control agent, a nozzle for dispersing the crowd control agent into the air, and an electronically controlled valve for selectively placing the nozzle into fluid communication with the container.

In certain embodiments, the modular unmanned aerial system further comprises an interface portion on the chassis adapted for removably and interchangeably attaching a plurality of interchangeable modular devices.

In certain embodiments, the modular unmanned aerial system further comprises a power supply disposed on the chassis. In certain embodiments the power source comprises a rechargeable battery.

In certain embodiments, the modular unmanned aerial system further comprises a radio frequency transceiver for receiving control signals from a remote control unit.

In certain embodiments, the modular unmanned aerial system further comprises an onboard processor and associated memory storing program instructions for controlling operation of the unmanned aerial system.

In certain embodiments, the modular unmanned aerial system further comprises one or more lights disposed on the chassis. In certain embodiments, the one or more lights are a color indicative of an emergency vehicle.

In certain embodiments, the modular unmanned aerial system further comprises a camera for acquiring one or both of photographic images and video images.

In certain embodiments, the modular unmanned aerial system further comprises one or both of a microphone and an audio speaker.

In certain embodiments, the modular unmanned aerial system further comprises a remote control unit for controlling operation of the unmanned aerial system.

In certain embodiments, the modular unmanned aerial system further comprises a navigation unit for obtaining position data. In certain embodiments, the navigation unit is a receiver for receiving signals from a satellite-based positioning system.

DETAILED DESCRIPTION OF THE PREFERRED EMBODIMENT(S)

Figure 1:
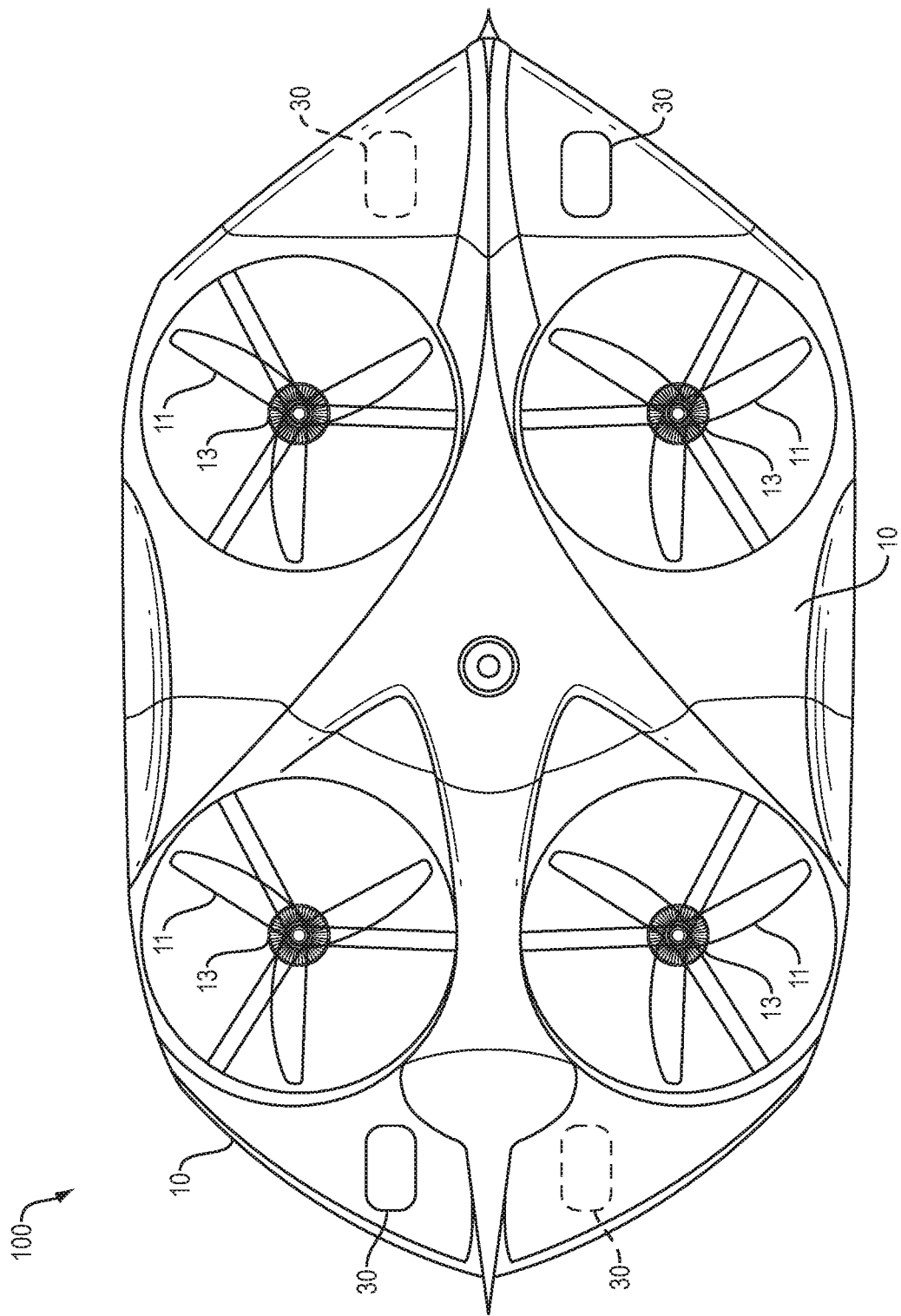
FIG. 1 is a top plan view of an unmanned aerial system in accordance with a first exemplary embodiment of the invention.
Figure 2:
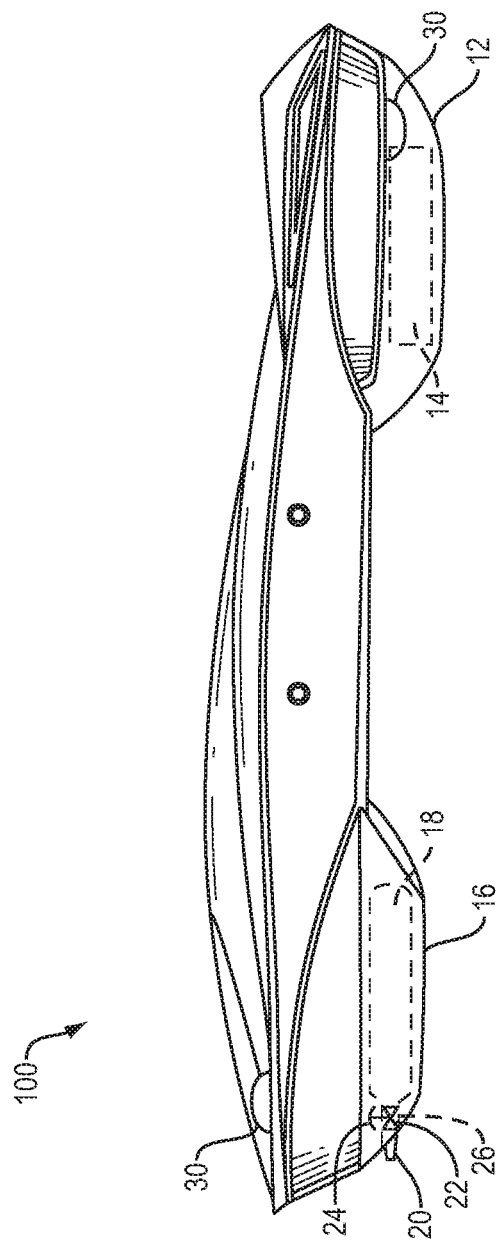
FIG. 2 is a side view of the embodiment appearing in FIG. 1.
Figure 3:
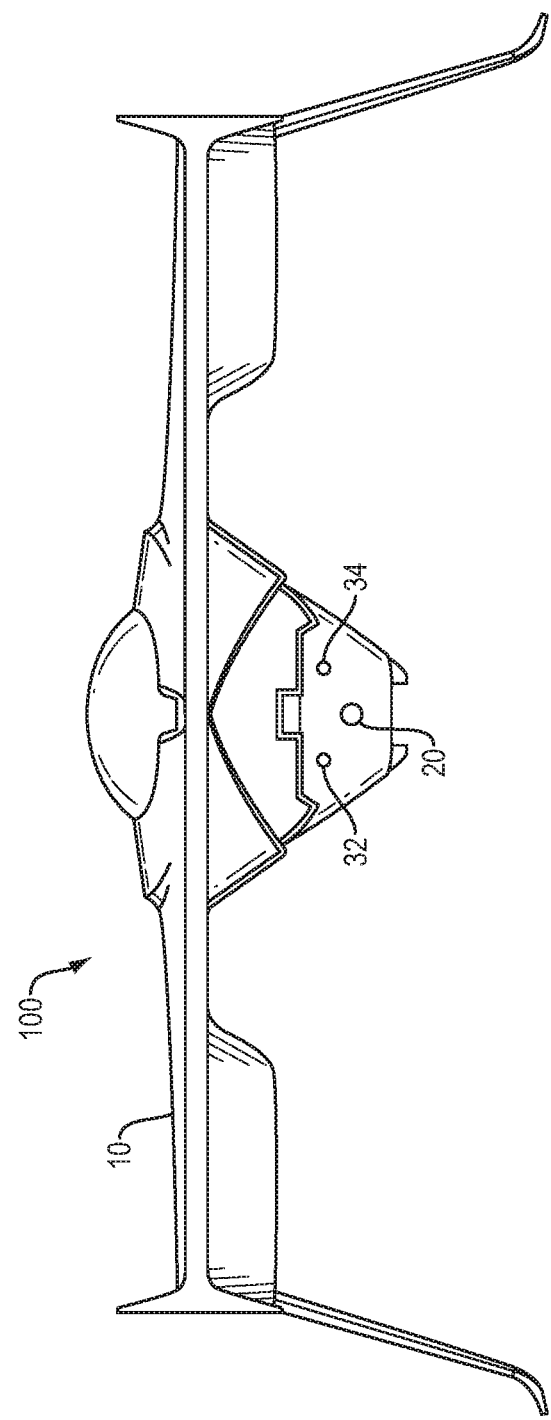
FIG. 3 is a front view of the embodiment appearing in FIG. 1.

Referring now to the drawings, in certain embodiments an unmanned aerial system, designated generally as 100, takes the form of a multi-rotor drone and includes a chassis 10 and multiple rotors 11 mounted thereto, which are servo-controlled by respective motors 13. In certain embodiments, the unmanned aerial system 100 is a quadcopter device having four rotors 11. The motors 13 can be controlled in differentiated manner via a remote control unit 25 to pilot the unmanned aerial system 100 with respect to attitude, speed, and ground position. In certain embodiments, each motor 13 is controlled by a respective microcontroller which, in turn, is controlled by a central controller 15. In certain embodiments, the central controller 15 includes an electronic memory associated therewith for storing program instructions and data. Reference herein to a processor being "configured" to perform certain tasks refers to such processor containing appropriate circuitry, program instructions, computer memory, electrical connections, and the like to perform a specified task and control circuitry for operating various components of the system. The processor may be implemented as a standard microprocessor or microcontroller with appropriate software, firmware, hardware, or any combination thereof.

Referring now to FIGS. 1-3 and 5 there is shown an exemplary dedicated or mission-specific crowd control unmanned aerial system 100. The unmanned aerial system 100 includes a chassis 10 having a battery compartment 12 housing a battery or battery pack 14 for powering the motors and other electrical components of the unmanned aerial system. In certain embodiments, the battery is a Lithium ion battery. In certain embodiments, the battery is a Lithium ion polymer (LiPo) battery. In certain embodiments, the battery 14 is chargeable with an AC and/or DC charging source.

In certain embodiments, the power supply 14 (whether rechargeable or non-rechargeable) may be disposed within a battery compartment 12 which is manually accessible, e.g., having a removable battery compartment cover (not shown), to allow the user to manually replace the power source. In certain embodiments, the unmanned aerial system 100 includes external charging contacts, wherein the unmanned aerial system is charged by connecting the unit to a charging dock for charging the power supply 14. In certain embodiments, the unmanned aerial system 100 is configured to be placed manually on the charging dock for recharging. In certain embodiments, the unmanned aerial system herein is configured to guide itself under programmed control to connect with a charging dock for recharging the battery 14.

The chassis 10 is formed of a durable, lightweight material. In certain embodiments, the chassis material is composite material, such as a highly oriented aerospace grade carbon fiber composite material to create a fuselage or chassis structure that is durable. The chassis serves as a mounting platform for electronic components and provides structural reinforcement. In certain embodiments, the chassis 10 is formed of a thermally conductive material (including metal/metal alloy or a thermally conductive polymer or composite material) and serves as a low profile heat sink, allowing the internal components to be sealed and still allow internal heat-producing components to disperse heat naturally to the outside of the unmanned aerial system during forward flights, increasing electronics performance and allowing for "Multi-Robot Teaming."

The chassis 10 further includes a chemical agent storage compartment 16 housing one or more canisters 18 containing a riot or crowd control agent such as a tear gas, pepper spray, MACE™, or other lachrymator agent, as would be understood by persons skilled in the art. Exemplary tear gas compounds include chloroacetophenone (CN), chlorobenzylidenemalononitrile (CS), chloropicrin (PS), bromobenzylcyanide (CA), and dibenzoxazepine (CR). In certain embodiments, the chemical agent comprises a mixture, such as a dispersion, emulsion, or solution, of a lachrymator agent in a carrier and a pressurized gas, for example nitrogen, as a propellant. As used herein, unless stated otherwise, the terms "crowd control agent" and "riot control agent" are used interchangeably, without regard to possible nuances in connotation. Each canister 18 is in fluid communication with an outlet nozzle 20. A valve 22 is disposed between the canister 18 and the nozzle 20. A valve actuator 24 is provided for selectively opening the valve 22 to place the chemical agent in fluid communication with the nozzle 20 to cause the chemical agent to be released into the air through the nozzle, e.g., as an aerosol spray or otherwise released as fine droplets or particles.

In certain embodiments, multiple canisters 18 are coupled to the nozzle via a manifold or like fluid passageway 26 having associated manifold flow control valves. In certain embodiments, the valve actuator/manifold flow control valves are electronically controlled remotely using a remote control unit (not shown), and which may be the remote control unit that is used for piloting and controlling operation of the unmanned aerial system. Each of the multiple canisters 18 may contain a chemical agent which is the same as or different than a chemical agent contained in the other canisters. In certain embodiments, each of the plurality of canisters 18 contains the same chemical agent. In certain embodiments, each of the plurality of canisters 18 contains a different chemical agent, wherein each canister is individually selectable using a remote control unit. In certain embodiments, one or more of the canisters may contain a combination of two or more crowd control agents. In certain embodiments, a fillable compartment defining a reservoir for chemical agent may be provided in place of or in addition the canisters 18. In certain embodiments, an onboard air compressor (not shown) may be provided to pressurize the reservoir and to cause the chemical agent to be dispersed through the nozzle 20 when the respective valve 22 is opened and the reservoir is placed in fluid communication with the nozzle. In embodiments having multiple sources of chemical agent capable of being placed in fluid communication with the nozzle, each fluid passageway may have a dedicated valve. Alternatively, a switch valve may be provided having multiple inlets fluidically coupled to the sources of chemical agent and a single outlet fluidically coupled to nozzle, wherein the switch valve is capable of placing a selected one of the multiple inlets into fluid communication with the single outlet.

In certain embodiments, one or more lights, such as LED lights 30, may be provided on the chassis 10. In certain embodiments, the color(s) of the lights have a color representative of a law enforcement or emergency services vehicle, such as blue, red, red and blue, or other color or color combination, e.g., in accordance with the laws or regulations of a given jurisdiction to alert or warn persons in the vicinity of the official nature of the unmanned aerial system. In certain embodiments, the lights 30 may comprise a light element within in an enclosure comprising a transparent or colored lens. In certain embodiments, the lights 30 comprise multicolor light elements and driver electronics or circuitry, e.g., controlled by the processor 15, to cause the light elements to emit a desired color. In certain embodiments, the lights 30 are provided on both the top and bottom of the chassis.

In certain embodiments, one or more audio speakers 32 and an associated audio amplifier circuit are provided. In certain embodiments, the audio output may be the sound of a siren to alert or warn persons in the vicinity of the presence of the unmanned aerial system. In certain embodiments, the audio output may be a prerecorded spoken message or warning for persons in the vicinity of the unmanned aerial system. In certain embodiments, the speaker may be used in conjunction with an associated communications system, such as a radio frequency (RF) transceiver 27, to allow a user to broadcast a spoken message to persons in the vicinity of the unmanned aerial system via a communication system on the unmanned aerial system associated with the audio speaker. In certain embodiments, the communication system may include a microphone and RF transceiver associated with the remote control unit 25 used for piloting and controlling operation of the unmanned aerial system 100.

In certain embodiments, one or more cameras 34, preferably video cameras, are mounted to the chassis. In certain embodiments, the one or more cameras includes a front camera for capturing images of a scene in front of the unmanned aerial system. In certain embodiments, the one or more cameras includes a vertical-view camera (not shown) for capturing images of the ground beneath the unmanned aerial system. In certain embodiments, the one or more cameras includes a panoramic camera or camera array for capturing images of a wide field of view, up to 360-degrees, of a scene around the unmanned aerial system. In certain embodiments, one or more microphones 33 are provided for recording audio of the scene.

In certain embodiments, a navigation unit 35 is provided for obtaining position data. In certain embodiments, the navigation system 35 is a receiver for a satellite-based positioning system such as Global Positioning System (GPS), GPS Precise Positioning Service (PPS), GPS Standard Positioning Service (SPS), Global Navigation Satellite System (GNSS), Global Orbiting Navigation Satellite System (GLOSNASS), GNSS-2, and the like. Alternatively or additionally, the navigation system 35 may be ground-based positioning system, such as LORAN, LORAN C, OMEGA, or other radio navigation system; and inertial navigation device; a terrain correlation system; a radar correlation system, or any combination of the foregoing. Position data include a current position of the unit 100 as well as logged data representative of a flight path of the unit 100.

Figure 4:
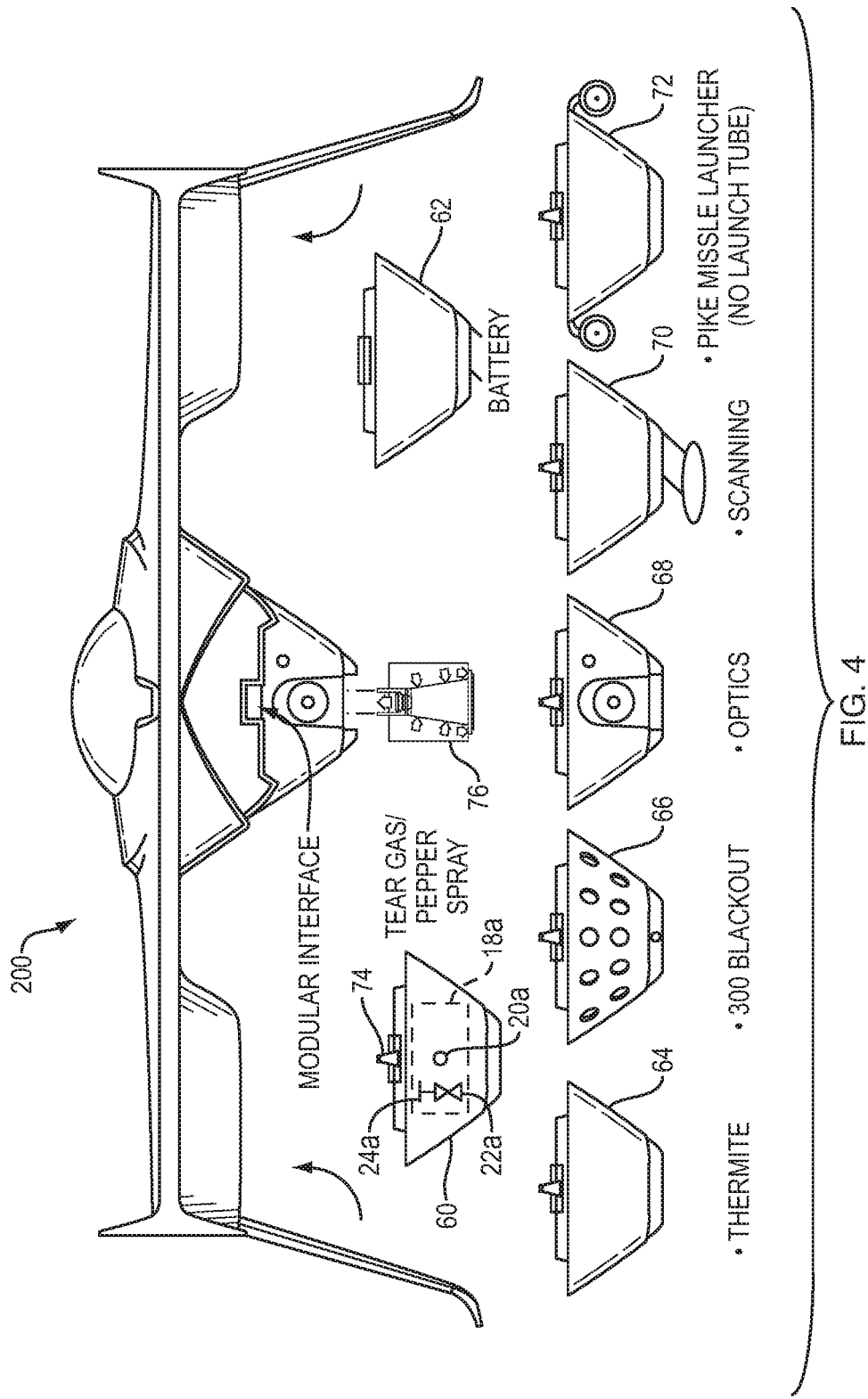
FIG. 4 is partially exploded view of an unmanned aerial system in accordance with a second exemplary embodiment of the invention.
Figure 5:
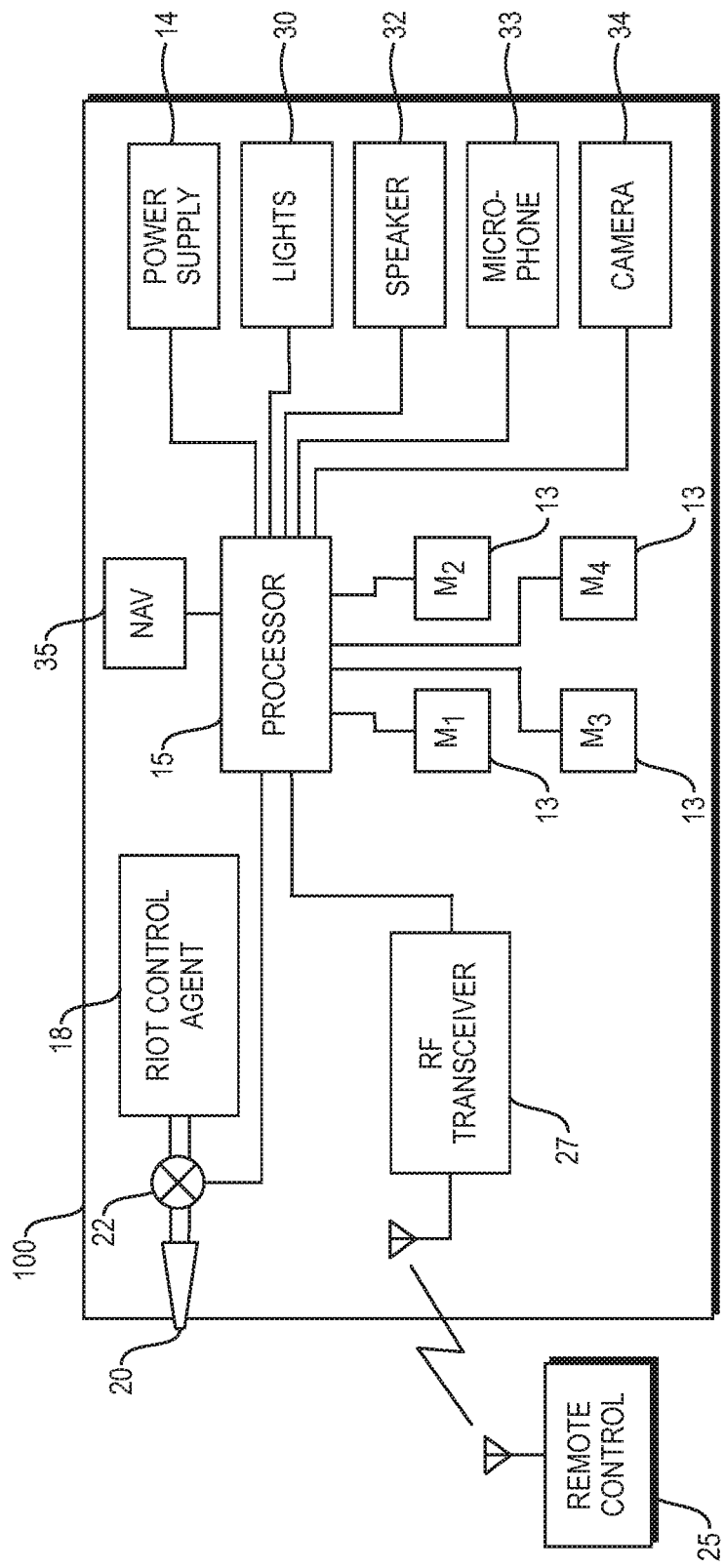
FIG. 5 is a block diagram illustrating the unmanned aerial system appearing in FIG. 1.

Referring now to FIG. 4, there is shown an exemplary modular unmanned aerial system 200, which includes a chassis 10a and a chemical agent module 60 having an interior compartment containing one or more canisters 18a containing a chemical lachrymator agent as described above in fluid communication with an outlet nozzle 20a, which is interchangeable with one or more other modules, such as a battery module 62, thermite (fuel/oxidizer) module 64, firearm cartridge module 66, gimbal camera module 68, scan head module 70, and large caliber munitions module 72, which may be as described in U.S. Provisional Application No. 62/520,370 filed Jun. 15, 2017, and U.S. nonprovisional application Ser. No. 16/009,373 filed Jun. 15, 2018, each of which is incorporated herein by reference in its entirety.

The module 60 includes a connector 74 which is removably connected to a modular interface or connector 76 on the chassis. The module 60 includes a valve 22a disposed between the chemical agent canister within the module and the nozzle 20a. A valve actuator 24a is provided for selectively opening the valve under the control of an on board processor or controller 15 to cause the chemical agent to be released through the nozzle as an aerosol spray. In certain embodiments, the valve actuator is controlled remotely using a remote control unit for piloting and controlling operation of the unmanned aerial system. In certain embodiments, a plurality of lachrymator canisters are provided within the module 60 which may be selectively fluidically coupled to the outlet nozzle via a manifold and manifold control valves, as described above.

In certain embodiments, one of the interchangeable modules is a "Scan Head Module" 70 which includes a camera/scanner/imager for generating point cloud data (X, Y, Z) mapping coordinates.

In certain embodiments, one of the interchangeable modules is a "Thermite Module" 64 carrying a charge of a fuel/oxidizer mixture, such as thermite. The module may also include a heat-producing component such as an incendiary charge, detonator, or the like, generating sufficient heat/temperature to initiate the thermite reaction when the Thermite Module has been placed at a target location.

In certain embodiments, one of the interchangeable modules is an firearm cartridge module 66 for firing a plurality of ammunition rounds. In certain embodiments, the ammunition rounds are 300 Blackout rifle cartridges.

In certain embodiments, one of the interchangeable modules is "Nacelle Hard Point Module" 72 to carry large caliber munitions such as a grenade, rocket propelled grenade (RPG), precision-guided munition (PGM), and so forth. In certain embodiments, the large caliber munition is a 40 mm munition. In certain embodiments, the munition is rocket propelled, having a small amount of propellant to discharge the munition from the launching platform before the motor ignites. In certain embodiments, the Nacelle Hard Point Module" is configured to carry a Raytheon PIKE Missile.

In certain embodiments, each interchangeable functional module may contain a power supply which provides power to operate the unmanned aerial system.

In certain embodiments, the unmanned aerial system is configured to return to a "home" docking station and drop off a module once it is no longer needed and pick up another module. In this manner, the unmanned aerial system herein will self-replenish itself (i.e., drop off a module that is no longer needed and pick up the next module), e.g., in accordance with a given "flight plan" or "mission plan". In alternative embodiments, the unmanned aerial system is configured to return to the operator wherein modules can be interchanged manually.

The invention has been described with reference to the preferred embodiments. Modifications and alterations will occur to others upon a reading and understanding of the preceding detailed description. It is intended that the invention be construed as including all such modifications and alterations insofar as they come within the scope of the appended claims and their equivalents.

The invention claimed is:

1. An unmanned aerial system for crowd control, comprising:

a chassis for attaching components of the unmanned aerial system;
one or more rotary wings, each of the one or more rotary wings drivable by a respective motor;
a first docking interface attached to the chassis, the first docking interface including a first interface receptacle;
a crowd control module detachably attachable to the first interface receptacle, the crowd control module comprising:
 a first connector which is complementary with the first interface receptacle;
 a container storing a pressurized source of a crowd control agent;
 a nozzle in fluid communication with the pressurized source of the crowd control agent for dispersing the crowd control agent;
 a valve disposed intermediate the pressurized source of the crowd control agent and the nozzle; and
 an electronically controlled valve actuator for selectively opening and closing the valve;
a second docking interface attached to the chassis, the second docking interface including a second interface receptacle for removably attaching a first battery module, the first battery module interchangeable with a like battery module when the first battery module is depleted.

2. The unmanned aerial system of claim 1, wherein the first battery module comprises a rechargeable battery.

3. The unmanned aerial system of claim 1, further comprising a radio frequency transceiver for receiving control signals from a remote control unit.

4. The unmanned aerial system of claim 1, further comprising an onboard processor and associated memory storing program instructions for controlling operation of the unmanned aerial system.

5. The unmanned aerial system of claim 1, further comprising one or more lights disposed on the chassis.

6. The unmanned aerial system of claim 5, wherein the one or more lights are a color indicative of an emergency vehicle.

7. The unmanned aerial system of claim 1, further comprising a camera for acquiring one or both of photographic images and video images.

8. The unmanned aerial system of claim 1, further comprising one or both of a microphone and an audio speaker.

9. The unmanned aerial system of claim 1, further comprising a remote control unit for controlling operation of the unmanned aerial system.

10. The unmanned aerial system of claim 1, further comprising a navigation unit for obtaining position data.

11. The unmanned aerial system of claim 10, wherein the navigation unit is a receiver for receiving signals from a satellite-based positioning system.

12. The modular unmanned aerial system of claim 1, wherein the first docking interface is adapted for removably attaching one or more interchangeable modular devices, the one or more interchangeable modular devices being interchangeable with the crowd control module.

13. The modular unmanned aerial system of claim 12, wherein the one or more interchangeable modules are selected from the group consisting of: a payload module carrying a charge of a fuel/oxidizer mixture, a firearm cartridge module, an optical module, a scanning module, a large caliber munitions module, and a hazard sensing module.

14. The modular unmanned aerial system of claim 12, further comprising a radio frequency transceiver for receiving control signals from a remote control unit.

15. The modular unmanned aerial system of claim 12, further comprising an onboard processor and associated memory storing program instructions for controlling operation of the unmanned aerial system.

16. The modular unmanned aerial system of claim 12, further comprising one or more lights disposed on the chassis.

17. The modular unmanned aerial system of claim 16, wherein the one or more lights are a color indicative of an emergency vehicle.

18. The modular unmanned aerial system of claim 12, further comprising a camera for acquiring one or both of photographic images and video images.

19. The modular unmanned aerial system of claim 12, further comprising one or both of a microphone and an audio speaker.

20. The modular unmanned aerial system of claim 12, further comprising a remote control unit for controlling operation of the unmanned aerial system.

21. The modular unmanned aerial system of claim 12, further comprising a navigation unit for obtaining position data.

22. The modular unmanned aerial system of claim 21, wherein the navigation unit is a receiver for receiving signals from a satellite-based positioning system.

* * * * *